(12) United States Patent
Wang et al.

(10) Patent No.: US 11,635,284 B1
(45) Date of Patent: Apr. 25, 2023

(54) TESTING APPARATUS FOR PILE END SETTLEMENT OF ROCK-SOCKETED DRIVEN PHC TUBE PILE AND INSTALLATION METHOD

(71) Applicants: QINGDAO UNIVERSITY OF TECHNOLOGY, Qingdao (CN); Qingdao Green Technology Geotechnical Engineering Co., Ltd., Qingdao (CN); Zhongji JiuRui Geotechnical Engineering Co., Ltd., Qingdao (CN); Shandong Luqiao Group Co., Ltd., Jinan, China, Jinan (CN); China State Construction Zhongxin Construction Engineering Co., Ltd. Shandong Branch, Qingdao (CN)

(72) Inventors: Yonghong Wang, Qingdao (CN); Mingyi Zhang, Qingdao (CN); Xiang Fang, Qingdao (CN); Bo Han, Qingdao (CN); Qijun Zhang, Qingdao (CN); Yishun Jiang, Qingdao (CN); Shiqiang Li, Qingdao (CN); Dazhong Xu, Qingdao (CN); Jun Wang, Qingdao (CN); Chuantong Zhang, Qingdao (CN); Yuning Ge, Qingdao (CN); Yamei Zhang, Qingdao (CN); Weihui Tian, Qingdao (CN); Ziguang Jia, Qingdao (CN); Xiaoning Liu, Qingdao (CN)

(73) Assignees: QINGDAO UNIVERSITY OF TECHNOLOGY, Qingdao (CN); Qingdao Green Technology Geotechnical Engineering Co., Ltd, Qingdao (CN); Zhongji JiuRui Geotechnical Engineering Co., Ltd., Qingdao (CN); Shandong Luqiao Group Co., Ltd., Jinan, China, Jinan (CN); China State Construction Zhongxin Construction Engineering Co., Ltd.Shandong Branch, Qingdao (CN)

( * ) Notice: Subject to any disclaimer, the term of this patent is extended or adjusted under 35 U.S.C. 154(b) by 0 days.

(21) Appl. No.: 17/846,951

(22) Filed: Jun. 22, 2022

(30) Foreign Application Priority Data

May 5, 2022 (CN) .......................... 202210479462.0

(51) Int. Cl.
*E02D 33/00* (2006.01)
*E02D 5/58* (2006.01)
(Continued)

(52) U.S. Cl.
CPC ........... *G01B 5/30* (2013.01); *G01N 15/0806* (2013.01)

(58) Field of Classification Search
CPC .. E02D 33/00; E02D 5/58; G01B 5/00; G01B 5/30; G01N 15/00; G01N 15/08; G01N 15/0806
See application file for complete search history.

(56) References Cited

U.S. PATENT DOCUMENTS 4,359,890 A * 11/1982 Coelus .................... E02D 33/00
73/84
7,604,436 B2   10/2009 Byun

FOREIGN PATENT DOCUMENTS

CN   111733897 A * 10/2020 ............. E02D 33/00
CN   111733897 A   10/2020
(Continued)

*Primary Examiner* — Nguyen Q. Ha

(57) ABSTRACT

Provided are a testing apparatus for a pile end settlement of a rock-socketed driven PHC tube pile and an installation method thereof. The testing apparatus comprises a PHC tube
(Continued)

pile, two measuring tubes, a cross pile tip, a pile tip steel plate, a fixer fixed in the PHC tube pile, a perforated steel plate located at a pile top of the PHC tube pile and a jack pressed on the perforated steel plate. The two measuring tubes are symmetrically arranged, the fixer is provided with two first measuring tube outlet holes, and the two measuring tubes respectively pass through the first measuring tube outlet holes of the fixer; and the perforated steel plate is also provided with two second measuring tube outlet holes, and the two measuring tubes respectively pass through the second measuring tube outlet holes of the perforated steel plate.
(FIG. 1)

8 Claims, 4 Drawing Sheets

(51) Int. Cl.
      *G01B 5/30*       (2006.01)
      *G01N 15/08*       (2006.01)

(56)            References Cited

FOREIGN PATENT DOCUMENTS

CN         113389230 A  *  9/2021  ............. E02D 33/00
WO    WO 2022163632 A1  *  4/2022  ............. E02D 33/00

* cited by examiner

TESTING APPARATUS FOR PILE END SETTLEMENT OF ROCK-SOCKETED DRIVEN PHC TUBE PILE AND INSTALLATION METHOD

CROSS REFERENCE TO RELATED APPLICATIONS

This application claims foreign priority of Chinese Patent Application No. 202210479462.0, filed on May 5, 2022 in the China National Intellectual Property Administration, the disclosures of all of which are hereby incorporated by reference.

TECHNICAL FIELD

The present invention belongs to the technical field of building construction devices, and in particular relates to a testing apparatus for a pile end settlement of a rock-socketed driven PHC tube pile and an installation method.

BACKGROUND

Rock-socketed cast-in-place piles have advantages such as high bearing capacity, small settlement and good seismic performance. However, due to the easy residual sediment at the bottoms of the cast-in-place piles, there are many types of procedures, and there are many uncontrollable factors in construction. The construction process has a great influence on the quality of the piles. Therefore, according to the geological conditions that an upper part is soft soil and a bearing layer is strongly weathered mudstone, precast piles may be used in the construction of rock-socketed piles, and a construction technology of precast piles combined with a hammering method is widely used. A "rock-socketed driven pile" formed by driving a pile end of the precast piles into strongly weathered mudstone often has some engineering problems in the construction process, such as difficult penetration, and the bearing capacity after the construction cannot meet the design requirements.

In order to analyze the reasons why a vertical compressive ultimate bearing capacity of a pile foundation does not meet the design requirements, it is necessary to determine the bearing capacity and settlement characteristics of the "rock-socketed driven pile" combined with a static load test, especially a pile end settlement, so as to judge whether the insufficient bearing capacity is caused by softening of mudstone at the pile end or destruction of the original rock structure.

Limited by the test conditions and research level, the research on the bearing capacity of the rock-socketed piles in a mudstone bearing layer is not deep enough at present, especially the accurate test of the pile end settlement of the "rock-socketed driven pile" is lacking.

Therefore, it is necessary to find a testing apparatus and method for the pile end settlement of the "rock-socketed driven pile" in the mudstone bearing layer.

SUMMARY

An object of the present invention is to provide a testing apparatus for a pile end settlement of a rock-socketed driven PHC tube pile which is easy to test a soil pressure and a pore water pressure at a pile-soil interface close to a pile body, and an installation method.

The present invention provides a testing apparatus for a pile end settlement of a rock-socketed driven PHC tube pile, comprising a PHC tube pile, two measuring tubes partially located in the PHC tube pile and extending out of a pile top of the PHC tube pile, a cross pile tip located at a pile end of the PHC tube pile, a pile tip steel plate connecting the PHC tube pile with the cross pile tip, a fixer fixed in the PHC tube pile, a perforated steel plate located at the pile top of the PHC tube pile and a jack to press on the perforated steel plate, wherein two measuring tubes are symmetrically arranged, the fixer is provided with two first measuring tube outlet holes, and the two measuring tubes respectively pass through the first measuring tube outlet holes of the fixer; and the perforated steel plate is also provided with two second measuring tube outlet holes, and the two measuring tubes respectively pass through the second measuring tube outlet holes of the perforated steel plate.

Preferably, the PHC tube pile is provided with a tube pile opening close to the pile top, and the fixer is located in the tube pile opening and located inside the PHC tube pile.

Preferably, the jack is located at an intermediate position of the perforated steel plate.

Preferably, a diameter of the jack is smaller than a spacing between the two measuring tubes.

Preferably, the cross pile tip is fixed with the pile tip steel plate by welding, the pile tip steel plate is fixed with the pile end of the PHC tube pile by welding, and tail ends of the two measuring tubes are symmetrically fixed on the pile tip steel plate.

Preferably, the testing apparatus further comprises two sealing cushion blocks respectively located on the two measuring tubes, a current pull rope micro-displacement sensor, a pull rope connecting the sealing cushion blocks with the current pull rope micro-displacement sensor and a beam pressed on the jack; wherein, the current pull rope micro-displacement sensor is fixed on a bottom portion of the beam.

The present invention also provides an installation method of the testing apparatus for the pile end settlement of the rock-socketed driven PHC tube pile, comprising the following steps of:

S1: determining lengths of the measuring tubes according to a length of the PHC tube pile, wherein the lengths of the measuring tubes are longer than the length of the PHC tube pile;

S2: determining positions of the measuring tubes on the pile tip steel plate, and connecting the measuring tubes with the pile tip steel plate by welding;

S3: S3: forming the tube pile opening on a pile wall of the PHC tube pile at a position having a certain distance from the pile top of the PHC tube pile, and fixing the measuring tubes on an inner wall of a pile body of the PHC tube pile by a fixing apparatus;

S4: after finishing pile driving, releasing the fixing apparatus for temporary fixing and measurement; after adjusting the measuring tubes, installing the fixer in the tube pile opening of the PHC tube pile, and drilling the first measuring tube outlet holes of the fixer according to distances between the measuring tubes and the pile walls on two sides of the PHC tube pile;

S5: after installing the fixer, welding the fixer on top portions of the measuring tubes to make the fixer be higher than the PHC tube pile; and S6: installing the perforated steel plate, and drilling the second measuring tube outlet holes of the perforated steel plate according to the positions of the measuring tubes.

Preferably, the installation method further comprises the following steps of: placing the jack on the perforated steel plate, placing the beam on the jack, placing the sealing cushion blocks on top ends of the measuring tubes, fixing the current pull rope micro-displacement sensor on the bottom portion of the beam, and connecting the pull rope of the current pull rope micro-displacement sensor with the sealing cushion blocks.

The present invention also provides an installation method of the testing apparatus for the pile end settlement of the rock-socketed driven PHC tube pile, comprising the following steps of:

S1: after driving the PHC tube pile, determining lengths of the measuring tubes according to a length of the PHC tube pile;

S2: determining positions of the measuring tubes on the pile tip steel plate, and applying glue at bottom ends of the measuring tubes, so that the measuring tubes and the pile tip steel plate are glued together;

S3: after installing the measuring tubes, forming the tube pile opening on a pile wall of the PHC tube pile, installing the fixer in the tube pile opening of the PHC tube pile, and drilling the first measuring tube outlet holes of the fixer according to distances between the measuring tubes and the pile walls on two sides of the PHC tube pile; and S4: after installing the fixer, installing the perforated steel plate, and determining the second measuring tube outlet holes of the perforated steel plate according to the distances between the measuring tubes and the pile walls on two sides of the PHC tube pile.

Preferably, the installation method further comprises the following steps of: placing the jack on the perforated steel plate, placing the beam on the jack, placing the sealing cushion blocks on top ends of the measuring tubes, fixing the current pull rope micro-displacement sensor on the bottom portion of the beam, and connecting the pull rope of the current pull rope micro-displacement sensor with the sealing cushion blocks.

The apparatus has simple and compact structure, small volume, light weight and low cost, is convenient to operate, firm and durable, has excellent dynamic and static performances, wide measurement range, high measuring accuracy and high sensitivity, and is easy to test a soil pressure and a pore water pressure at a pile-soil interface close to a pile body.

DETAILED DESCRIPTION

Figure 1:
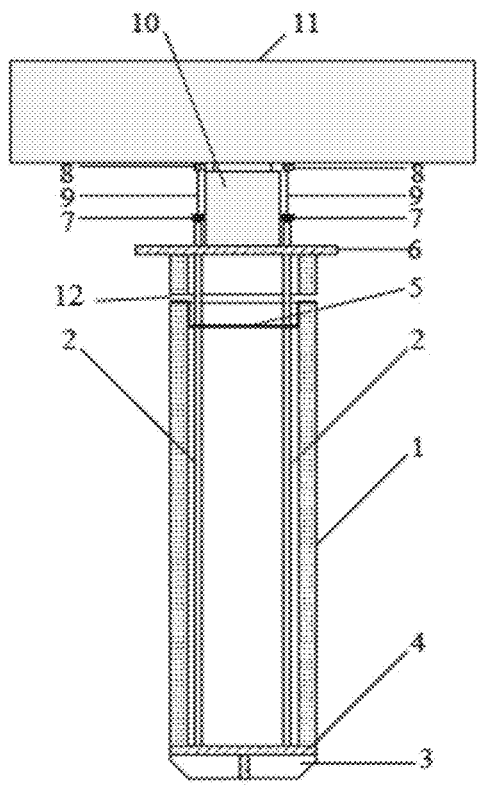
FIG. 1 is a schematic structure diagram of a testing apparatus for a pile end settlement of a rock-socketed driven PHC tube pile according to an embodiment of the present invention.
Figure 2:
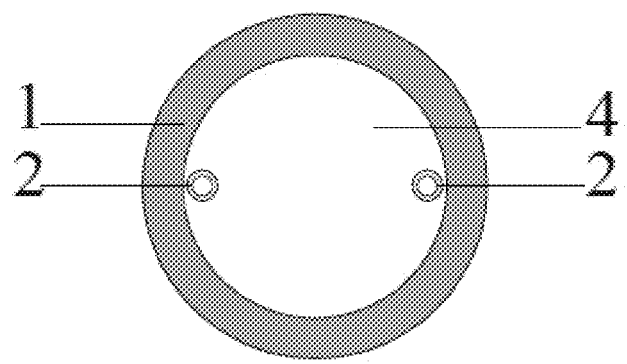
FIG. 2 is a top view of the testing apparatus for the pile end settlement of the rock-socketed driven PHC tube pile according to the embodiment of the present invention.

To make the objects, technical solutions, and advantages of the present invention clearer, the present invention will be further described in details hereinafter with reference to the accompanying drawings and embodiments. It should be understood that the specific embodiments described herein are only used to explain the present invention, but are not intended to limit the present invention.

As shown in FIG. 1 to FIG. 5, the present invention discloses a testing apparatus for a pile end settlement of a rock-socketed driven PHC tube pile, which comprises: a PHC tube pile (PHC: pre-stressed high-strength concrete; pre-stressed high-strength concrete tube pile) 1, two measuring tubes 2 partially located in the PHC tube pile 1 and extending out of a pile top of the PHC tube pile 1, a cross pile tip 3 located at a pile end of the PHC tube pile 1, a pile tip steel plate 4 connecting the PHC tube pile 1 with the cross pile tip 3, a fixer 5 fixed in the PHC tube pile 1, a perforated steel plate 6 located at the pile top of the PHC tube pile 1, two sealing cushion blocks 7 respectively located on the two measuring tubes 2, a current pull rope micro-displacement sensor 8, a pull rope 9 connecting the sealing cushion blocks 7 with the current pull rope micro-displacement sensor 8, a jack 10 pressed on the perforated steel plate 6 and a beam 11 pressed on the jack 10.

The cross pile tip 3 is fixed with the pile tip steel plate 4 by welding, the pile tip steel plate 4 is fixed with the pile end of the PHC tube pile 1 by welding, and tail ends of the two measuring tubes 2 are symmetrically fixed on the pile tip steel plate 4.

Figure 3:
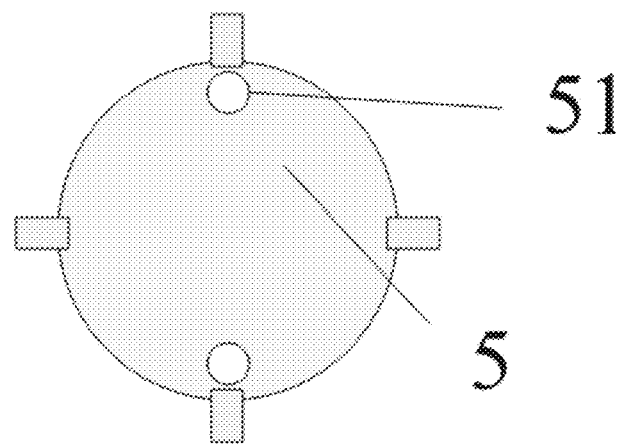
FIG. 3 is a schematic structure diagram of a fixer of the testing apparatus for the pile end settlement of the rock-socketed driven PHC tube pile according to the embodiment of the present invention.
Figure 4:
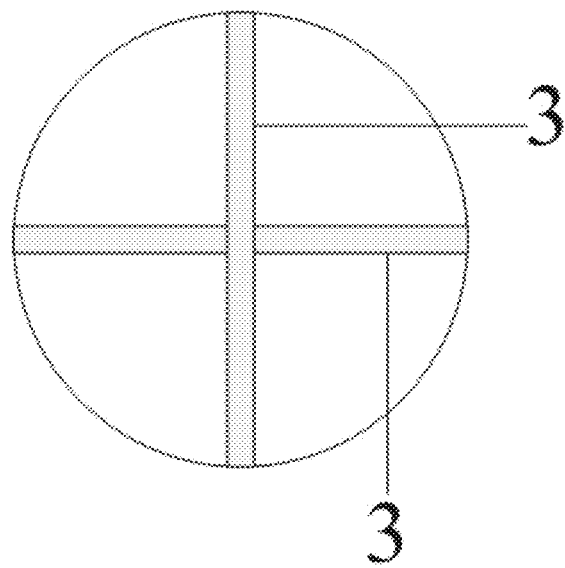
FIG. 4 is a top view of a pile tip steel plate of the testing apparatus for the pile end settlement of the rock-socketed driven PHC tube pile according to the embodiment of the present invention.

As shown in FIG. 3, the fixer 5 is provided with two first measuring tube outlet holes 51, and the two measuring tubes 2 respectively pass through the first measuring tube outlet holes 51 of the fixer 5.

Figure 5:
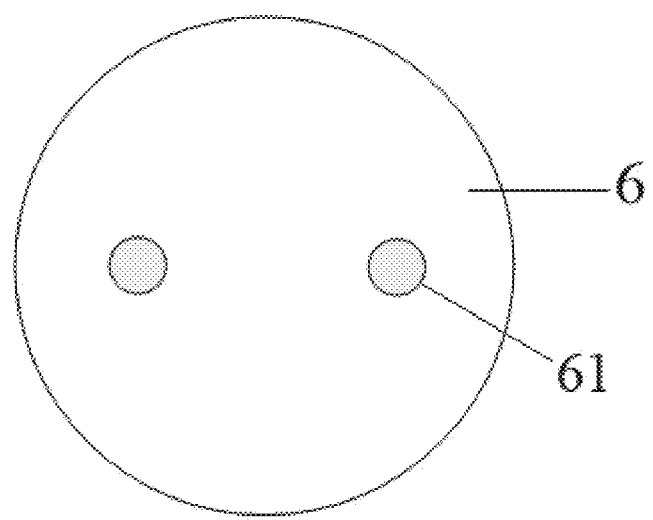
FIG. 5 is a schematic structural diagram of a perforated steel plate of the testing apparatus for the pile end settlement of the rock-socketed driven PHC tube pile according to the embodiment of the present invention.

As shown in FIG. 5, the perforated steel plate 6 is provided with two second measuring tube outlet holes 61, and the two measuring tubes 2 respectively pass through the second measuring tube outlet holes 61 of the perforated steel plate 6.

The PHC tube pile 1 is provided with a tube pile opening 12 close to the pile top, and the fixer 5 is located in the tube pile opening 12 and located inside the PHC tube pile 1.

The two measuring tubes 2 are welded on the pile tip steel plate 4 by a pre-installation method, or the two measuring tubes 2 are fixed on the pile tip steel plate 4 by epoxy resin by a post-installation method, and the measuring tubes 2 are both at least 10 cm higher than the pile top of the PHC tube pile 1 after hammering.

The fixer 5 and the perforated steel plate 6 are respectively placed in the tube pile opening 12 of the PHC tube pile 1 and the pile top of the PHC tube pile 1, the jack 10 is placed on the perforated steel plate 6, the jack 10 is located at an intermediate position of the perforated steel plate 6, and a diameter of the jack 10 is smaller than a spacing between the two measuring tubes 2. The sealing cushion blocks 7 are placed at top portions of the two measuring tubes 2, and the current pull rope micro-displacement sensor 8 is fixed at a bottom portion of the beam 11. The pull rope 9 of the current pull rope micro-displacement sensor 8 is connected with the sealing cushion blocks 7.

Seamless stainless steel tubes are used as the measuring tubes of the present invention, a diameter of the measuring tube 2 is 19 mm to 21 mm (preferably 20 mm) and a thickness of the measuring tube is 2 mm to 4 mm (preferably 3mm). The measuring tubes 2 are firmly welded or bonded with the pile tip steel plate 4, which are not easy to deform, and are suitable for settlement measurement. Diameters of holes on the fixer 5 and the perforated steel plate 6 are 21 mm to 23 mm (preferably 22 mm), which are slightly larger than the diameter of the measuring tube 2. A diameter of the fixer 5 is smaller than a diameter of the PHC tube pile 1, which is convenient for installation. A diameter of the perforated steel plate 6 is larger than the diameter of the PHC tube pile 1, which is convenient for placing the jack 10 and has uniform stress. The cross pile tip 3 and the pile tip steel plate 4 have the same diameter as that of the PHC tube pile 1, and are integrated with the PHC tube pile 1 after welding. A height of the cross pile tip 3 is 9 cm to 11 cm (preferably 10 cm).

There are two installation methods for the pile tip steel plate 4 at the pile end of the PHC tube pile 1 and the measuring tubes 2, which are installation before pile driving (pre-installation method) and installation after pile driving (post-installation method).

Figure 6:
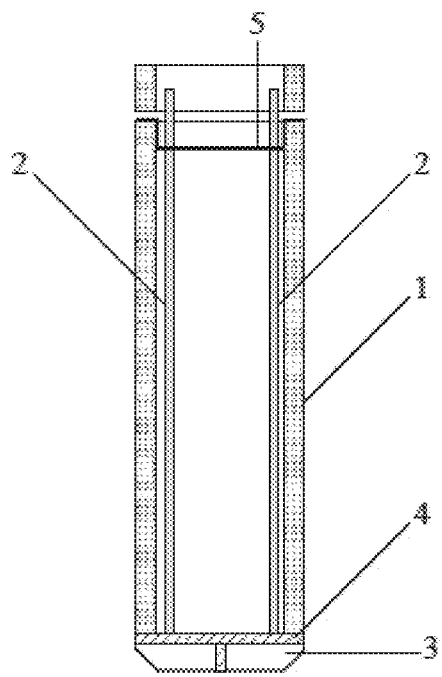
FIG. 6 is a schematic principle diagram of a pre-installation method of the testing apparatus for the pile end settlement of the rock-socketed driven PHC tube pile according to an embodiment of the present invention.

FIG. 6 shows an installation method of the testing apparatus for the pile end settlement of the rock-socketed driven PHC tube pile according to the present invention. This method is the pre-installation method, comprising the following steps of:

S1: determining lengths of the measuring tubes 2 according to a length of the PHC tube pile 1 to ensure that the measuring tubes 2 are not destroyed during pile driving, wherein the lengths of the measuring tubes 2 are longer than the length of the PHC tube pile 1 by 4 cm to 6 cm (preferably 5 cm);

S2: determining positions of the measuring tubes 2 on the pile tip steel plate 4 (making the spacing between the two measuring tubes 2 large enough to ensure that there is enough space to place the jack in a subsequent static load test), and connecting the measuring tubes 2 with the pile tip steel plate 4 by welding;

S3: forming the tube pile opening 12 on a pile wall of the PHC tube pile 1 at a position having a certain distance from the pile top of the PHC tube pile 1 (the distance is 19 cm to 21 cm, and preferably 20 cm), and fixing the measuring tubes on an inner wall of a pile body of the PHC tube pile 1 by a fixing apparatus such as an iron wire to prevent the measuring tubes 2 from being destroyed during pile driving;

S4: after finishing pile driving, releasing the fixing apparatus such as the iron wire for temporary fixing and measurement; after adjusting the measuring tubes 2, installing the fixer 5 in the tube pile opening 12 of the PHC tube pile 1, and drilling the first measuring tube outlet holes 51 of the fixer 5 according to distances between the measuring tubes 2 and the pile walls on two sides of the PHC tube pile 1, and ensuring that apertures of the first measuring tube outlet holes 51 are slightly larger than the diameters of the measuring tubes 2;

S5: after installing the fixer 5, welding the fixer on top portions of the measuring tubes 2 to make the fixer be higher than the PHC tube pile 1 by 9 cm to 11 cm (preferably 10 cm), so as to facilitate the measurement of displacement changes of the pile end of the PHC tube pile 1 in the static load test;

S6: installing the perforated steel plate 6, and drilling the second measuring tube outlet holes 61 of the perforated steel plate 6 according to the positions of the measuring tubes 2; and S7: placing the jack 10 on the perforated steel plate 6, placing the beam 11 on the jack 10, placing the sealing cushion blocks 7 on top ends of the measuring tubes 2, fixing the current pull rope micro-displacement sensor 8 on the bottom portion of the beam 11, and connecting the pull rope 9 of the current pull rope micro-displacement sensor 8 with the sealing cushion blocks 7.

Figure 7:
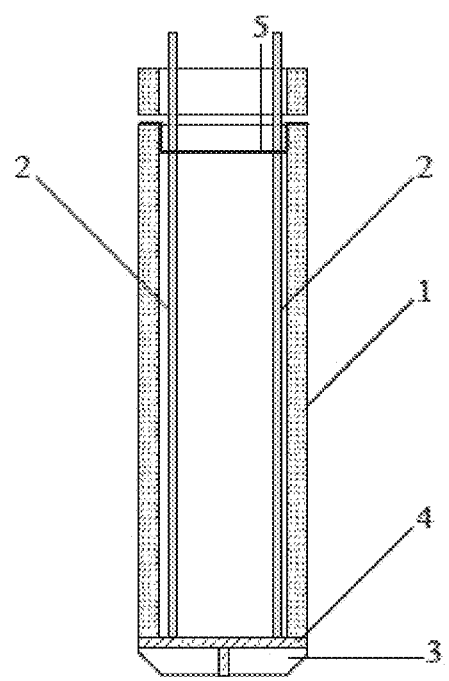
FIG. 7 is a schematic principle diagram of a post-installation method of the testing apparatus for the pile end settlement of the rock-socketed driven PHC tube pile according to an embodiment of the present invention.

FIG. 7 shows an installation method of the testing apparatus for the pile end settlement of the rock-socketed driven PHC tube pile according to the present invention. This method is the post-installation method, comprising the following steps of:

S1: after driving the PHC tube pile 1, determining lengths of the measuring tubes 2 according to a length of the PHC tube pile 1, and ensuring that top ends of the measuring tubes 2 are higher than the pile top of the PHC tube pile 1 by 9 cm to 11 cm (preferably 10 cm);

S2: determining positions of the measuring tubes 2 on the pile tip steel plate 4, and applying glue at bottom ends of the measuring tubes 2, so that the measuring tubes 2 and the pile tip steel plate 4 are glued together by the epoxy resin (making the spacing between the two measuring tubes 2 be large enough to ensure that there is enough space to place the jack 10 in the subsequent static load test);

S3: after installing the measuring tubes 2, forming the tube pile opening 12 on a pile wall of the PHC tube pile 1 at a position 19 cm to 21 mm (preferably 20 mm) near the top of the PHC tube pile 1, installing the fixer 5 in the tube pile opening 12 of the PHC tube pile 1, drilling the first measuring tube outlet holes 51 of the fixer 5 according to distances between the measuring tubes 2 and the pile walls on two sides of the PHC tube pile 1, and ensuring that apertures of the first measuring tube outlet holes 51 are slightly larger than the diameters of the measuring tubes 2;

S4: after installing the fixer 5, installing the perforated steel plate 6, determining the second measuring tube outlet holes 61 of the perforated steel plate 6 according to the distances between the measuring tubes 2 and the pile walls on two sides of the PHC tube pile 1, and ensuring that apertures of the second measuring tube outlet hole 61 are slightly larger than the diameters of the measuring tubes 2; and S5: placing the jack 10 on the perforated steel plate 6, placing the beam 11 on the jack 10, placing the sealing cushion blocks 7 on top ends of the measuring tubes 2, fixing the current pull rope micro-displacement sensor 8 on the bottom portion of the beam 11, and connecting the pull rope of the current pull rope micro-displacement sensor 8 with the sealing cushion blocks 7.

The apparatus has simple and compact structure, small volume, light weight and low cost, is convenient to operate, firm and durable, has high measuring accuracy, good stability and high reliability, and is easy to test the pile end settlement of the rock-socketed driven PHC tube pile.

The description above is only the preferred embodiments of the present invention, and is not intended to limit the present invention in any form. Although the present invention has been disclosed by the preferred embodiments above, the preferred embodiments are not intended to limit the present invention. Those skilled in the art can make some changes or modifications as equivalent embodiments with equivalent changes by using the technical contents disclosed above without departing from the scope of the technical solutions of the present invention. However, for the contents not departing from the scope of the technical solutions of the present invention, any simple amendments, equivalent changes and modifications made to the above embodiments according to the technical essence of the present invention are still included in the scope of the technical solutions of the present invention.

The invention claimed is:

1. A testing apparatus for a pile end settlement of a rock-socketed driven PHC tube pile, comprising a PHC tube pile, two measuring tubes partially located in the PHC tube pile and extending out of a pile top of the PHC tube pile, a cross pile tip located at a pile end of the PHC tube pile, a pile tip steel plate connecting the PHC tube pile with the cross pile tip, a fixer fixed in the PHC tube pile, a perforated steel plate located at the pile top of the PHC tube pile and a jack to press on the perforated steel plate, wherein the two measuring tubes are symmetrically arranged, the fixer is provided with two first measuring tube outlet holes, and the two measuring tubes respectively pass through the first measuring tube outlet holes of the fixer; and the perforated steel plate is also provided with two second measuring tube outlet holes, and the two measuring tubes respectively pass through the second measuring tube outlet holes of the perforated steel plate.

2. The testing apparatus for the pile end settlement of the rock-socketed driven PHC tube pile according to claim 1, wherein the PHC tube pile is provided with a tube pile opening close to the pile top, and the fixer is located in the tube pile opening and located inside the PHC tube pile.

3. The testing apparatus for the pile end settlement of the rock-socketed driven PHC tube pile according to claim 1, wherein the jack is located at an intermediate position of the perforated steel plate.

4. The testing apparatus for the pile end settlement of the rock-socketed driven PHC tube pile according to claim 1, wherein a diameter of the jack is smaller than a spacing between the two measuring tubes.

5. The testing apparatus for the pile end settlement of the rock-socketed driven PHC tube pile according to claim 1, wherein the cross pile tip is fixed with the pile tip steel plate by welding, the pile tip steel plate is fixed with the pile end of the PHC tube pile by welding, and tail ends of the two measuring tubes are symmetrically fixed on the pile tip steel plate.

6. The testing apparatus for the pile end settlement of the rock-socketed driven PHC tube pile according to claim 1, further comprising two sealing cushion blocks respectively located on the two measuring tubes, a current pull rope micro-displacement sensor, a pull rope connecting the sealing cushion blocks with the current pull rope micro-displacement sensor and a beam pressed on the jack; wherein, the current pull rope micro-displacement sensor is fixed on a bottom portion of the beam.

7. An installation method of the testing apparatus for the pile end settlement of the rock-socketed driven PHC tube pile according to claim 1, comprising the following steps of:

S1: after driving the PHC tube pile, determining lengths of the measuring tubes according to a length of the PHC tube pile;

S2: determining positions of the measuring tubes on the pile tip steel plate, and applying glue at bottom ends of the measuring tubes, so that the measuring tubes and the pile tip steel plate are glued together;

S3: after installing the measuring tubes, forming the tube pile opening on a pile wall of the PHC tube pile, installing the fixer in the tube pile opening of the PHC tube pile, and drilling the first measuring tube outlet holes of the fixer according to distances between the measuring tubes and the pile walls on two sides of the PHC tube pile; and S4: after installing the fixer, installing the perforated steel plate, and determining the second measuring tube outlet holes of the perforated steel plate according to the distances between the measuring tubes and the pile walls on two sides of the PHC tube pile.

8. The installation method of the testing apparatus for the pile end settlement of the rock-socketed driven PHC tube pile according to claim 7, further comprising the following steps of: placing the jack on the perforated steel plate, placing the beam on the jack, placing the sealing cushion blocks on top ends of the measuring tubes, fixing the current pull rope micro-displacement sensor on the bottom portion of the beam, and connecting the pull rope of the current pull rope micro-displacement sensor with the sealing cushion blocks.

* * * * *